US009425713B2

(12) United States Patent
Haugland

(10) Patent No.: US 9,425,713 B2
(45) Date of Patent: Aug. 23, 2016

(54) METHOD AND DEVICE FOR STARTING MOTORS IN WEAK GRIDS

(75) Inventor: Torbjörn Haugland, Bergen (NO)

(73) Assignee: Rolls-Royce Marine AS Power Electric Systems Bergen, Bergen (NO)

(*) Notice: Subject to any disclaimer, the term of this patent is extended or adjusted under 35 U.S.C. 154(b) by 172 days.

(21) Appl. No.: 13/879,861

(22) PCT Filed: Sep. 15, 2011

(86) PCT No.: PCT/NO2011/000251
§ 371 (c)(1),
(2), (4) Date: Apr. 17, 2013

(87) PCT Pub. No.: WO2012/064197
PCT Pub. Date: May 18, 2012

(65) Prior Publication Data
US 2013/0214719 A1    Aug. 22, 2013

(30) Foreign Application Priority Data
Oct. 26, 2010 (NO) .................................. 20101454

(51) Int. Cl.
*H02P 1/16* (2006.01)
*H02P 1/30* (2006.01)
*H02P 1/52* (2006.01)

(52) U.S. Cl.
CPC ... *H02P 1/30* (2013.01); *H02P 1/52* (2013.01)

(58) Field of Classification Search
CPC ....... H02M 5/27; H02M 5/271; H02M 7/483; H02P 1/021; H02P 27/06
USPC ......... 318/778, 434, 438, 455, 461, 503, 506, 318/507; 361/3, 31, 35; 363/120, 121, 123
See application file for complete search history.

(56) References Cited

U.S. PATENT DOCUMENTS

| 4,525,658 | A | * | 6/1985 | Yanagida ...................... 388/815 |
| 4,611,155 | A | * | 9/1986 | Kurakake ...................... 318/603 |
| 4,748,394 | A | * | 5/1988 | Watanabe ............... B66B 25/00 198/330 |
| 4,935,686 | A |   | 6/1990 | Stacey |
| 5,914,582 | A | * | 6/1999 | Takamoto et al. ............ 318/801 |
| 7,508,160 | B1 | * | 3/2009 | Rudniski ...................... 318/801 |

(Continued)

FOREIGN PATENT DOCUMENTS

EP    2096748 A2    9/2009

OTHER PUBLICATIONS

International Search Report and Written Opinion dated Jan. 29, 2012.

*Primary Examiner* — Bentsu Ro
*Assistant Examiner* — Thai Dinh
(74) *Attorney, Agent, or Firm* — Alix, Yale & Ristas, LLP

(57) ABSTRACT

Method and device for starting a motor (12) in weak grids, especially asynchronous motors, which motor after start-up is supplied by a supply grid (13). The device (11) includes a frequency converter (14), which is rated in relation to the size of the motor (12) and arranged to bring the motor (12) up in speed, arranged to synchronize output voltage with voltage from the supply grid (13), and arranged for connecting the motor (12) to the supply grid (13) after the voltage of the motor is synchronized with the voltage of the supply grid (13). The main object is to do this with as low costs as possible and in the most space-saving manner.

18 Claims, 2 Drawing Sheets

(56) References Cited

U.S. PATENT DOCUMENTS

| | | | |
|---|---|---|---|
| 8,013,555 B2* | 9/2011 | Thornell-Pers | 318/432 |
| 8,014,110 B2* | 9/2011 | Schnetzka et al. | 361/31 |
| 8,384,337 B2* | 2/2013 | Jahkonen | H02P 4/00 198/321 |
| 2008/0174255 A1* | 7/2008 | Schnetzka | F25B 49/025 318/12 |
| 2009/0109713 A1* | 4/2009 | Schnetzka | H02M 7/003 363/34 |
| 2009/0218962 A1* | 9/2009 | Kubal et al. | 318/102 |
| 2010/0085787 A1* | 4/2010 | Kane et al. | 363/123 |

* cited by examiner

METHOD AND DEVICE FOR STARTING MOTORS IN WEAK GRIDS

FIELD OF INVENTION

The present disclosure relates to a method for starting electrical motors in weak grids, especially asynchronous motors as well as a device for starting electrical motors in weak grids, especially asynchronous motors.

BACKGROUND

Starting asynchronous in weak grids can often be a problem due to high starting current, which cause large voltage drops, and that it in extreme cases will not be enough current available for starting the motor.

An asynchronous motor usually draws between five and nine times nominal current (In) if it is directly connected to the grid.

To reduce this, different starting methods are usually used, such as, for example, a Y/D-starter, autotransformer starter, soft starter, etc., which can reduce the starting current down to between 1.5-3×In. Even this may in some cases be high enough, especially for vessel plants which have limited generator capacity and large motors to be started. Other disadvantages with known systems and methods are, among others, the need for space and costs due to over-dimensioning to handle high starting current. Another drawback to these systems and methods is that the solutions result in large voltage drops and transients during starting of an electrical motor. In some cases there is also a requirement for maximum allowed voltage variations in the grid, something the known solutions fails to meet.

From EP 2096748 A2 it is known a method and device for starting AC motors in weak grids. The device includes a frequency converter which is used for starting the motor and electromagnetic switches, which switches are used for changing from frequency converter to direct grid supply. It is further described that the frequency converter is stopped before a supply source is changed, and that the control of the switches start before the frequency converter is stopped.

SUMMARY

The disclosure provides a device and method for starting electrical motors in weak grids while solving the above mentioned drawbacks of the known systems.

Further disclosed is a device and method which can start a motor with less than 1×In starting current.

Further disclosed is a device which reduces the need for available installed generator capacity or installed current capacity in the supply grid.

The disclosed device and method reduces the need for space for the device for starting a motor, and substantially reduces cost thereof.

Finally, the disclosure also provides a device and method which results in reduced motor current by removing magnetizing current of the motor.

The disclosed method and device is especially suitable for starting asynchronous motors which have relatively low load at start, i.e. e.g. 0-50% kW of motor size, more preferably 0-30% kW of motor size and even more preferable approximately 10-20% kW of motor size, and which can start a motor with less than 1×In starting current.

A device according to the disclosure includes a frequency converter which is rated in relation to motor size to bring a motor up in speed, preferably 0-70% of motor size, more preferably 0-50% of motor size and even more preferable 0-30% of motor size, i.e. dependent of the necessary starting moment of the application.

To be able to reduce the size of the frequency converter the device includes a sinus filter and an autotransformer arranged to the output of the frequency converter. This allows the frequency converter to deliver a high current at low voltage.

The frequency converter is arranged to synchronize output voltage to voltage of a supply grid which powers the motor continuously after it is started.

When voltage of the motor and voltage of the supply grid are in phase the frequency converter is bypassed, and the motor connected to the supply grid and ready for load. For this the device is provided with means for reading voltage and phase angle of the supply grid and motor, so that the device can switch to direct operation at the right time, i.e. when the voltage of the motor is in phase with the voltage of the supply grid, or some degrees in front of the voltage of the supply grid to compensate for drop in motor speed as a consequence of switching time from frequency converter to supply grid.

For connecting and disconnecting, i.e. bypass of the device, the device includes switches.

The above described device is arranged in parallel between the supply grid and the motor. The device further preferably includes a capacitor battery arranged in parallel with the motor to remove magnetizing current which the motor draws, so that the frequency converter only supplies the motor with active current. The capacitor battery also reduces the current pulse in connection with switching between frequency converter and grid, as it maintains the residual voltage in the motor when it is switched from frequency converter to grid.

For control of the device, the device includes a control unit provided with means and/or software for controlling the device.

A method for starting a motor in weak grids includes the following steps:

a) verifying that the motor (12) is not connected to the supply grid (13);

b) connecting the motor (12) to a frequency converter (14);

c) using the frequency converter (14) to raise the rotational speed of the motor (12) by running output frequency from 0 Hz to the frequency of the supply grid;

d) removing magnetizing current of the motor (12) with a capacitor battery (17) arranged in parallel with the motor (12), so that the frequency converter (14) supplies the motor (12) with active current only;

e) reading voltage and phase angle of the supply grid (13), and thereafter synchronizing the voltage of the motor (12) to a phase angle equal to or in front of the phase angle of the voltage of the supply grid (13) to compensate for a potential drop in motor speed as a consequence of switching time from frequency converter (14) to supply grid (13);

f) switching the powering of the motor (12) from frequency converter (14) to supply grid (13) when the output voltage of the frequency converter (14) and voltage of the supply grid (13) are synchronous.

The method can include, by means of switching devices, verifying that the motor is not connected to the supply grid and then connect the motor to the frequency converter. The method can also include starting the frequency converter.

The method can include reading frequency of the supply grid to determine when the output frequency is identical with the frequency of the supply grid.

The method can include removing magnetizing current from the motor by means of a capacitor battery arranged in parallel with the motor, so that the frequency converter only provides the motor with active current.

The method can include reading voltage and phase angle of the motor, so that powering of the motor can be switched from power from the frequency converter to supply grid as the voltage of the motor is synchronized with equal phase angle as the voltage of the supply grid, or some degrees in front of the supply grid.

The method can include confirming that disconnection of the frequency converter is performed before the motor is connected to the supply grid.

The method can include reducing current pulse in connection with switching between frequency converter and supply grid by means of a capacitor battery arranged in parallel with the motor to maintain residual voltage in the motor as it is switched from the frequency converter to the supply grid. The method can also include stopping the frequency converter.

After the above mentioned steps are performed the motor is started and directly supplied by the supply grid and ready for load.

BRIEF DESCRIPTION OF THE DRAWINGS

The invention will below be described in detail with references to the attached drawings, where.

DETAILED DESCRIPTION

Figure 1:
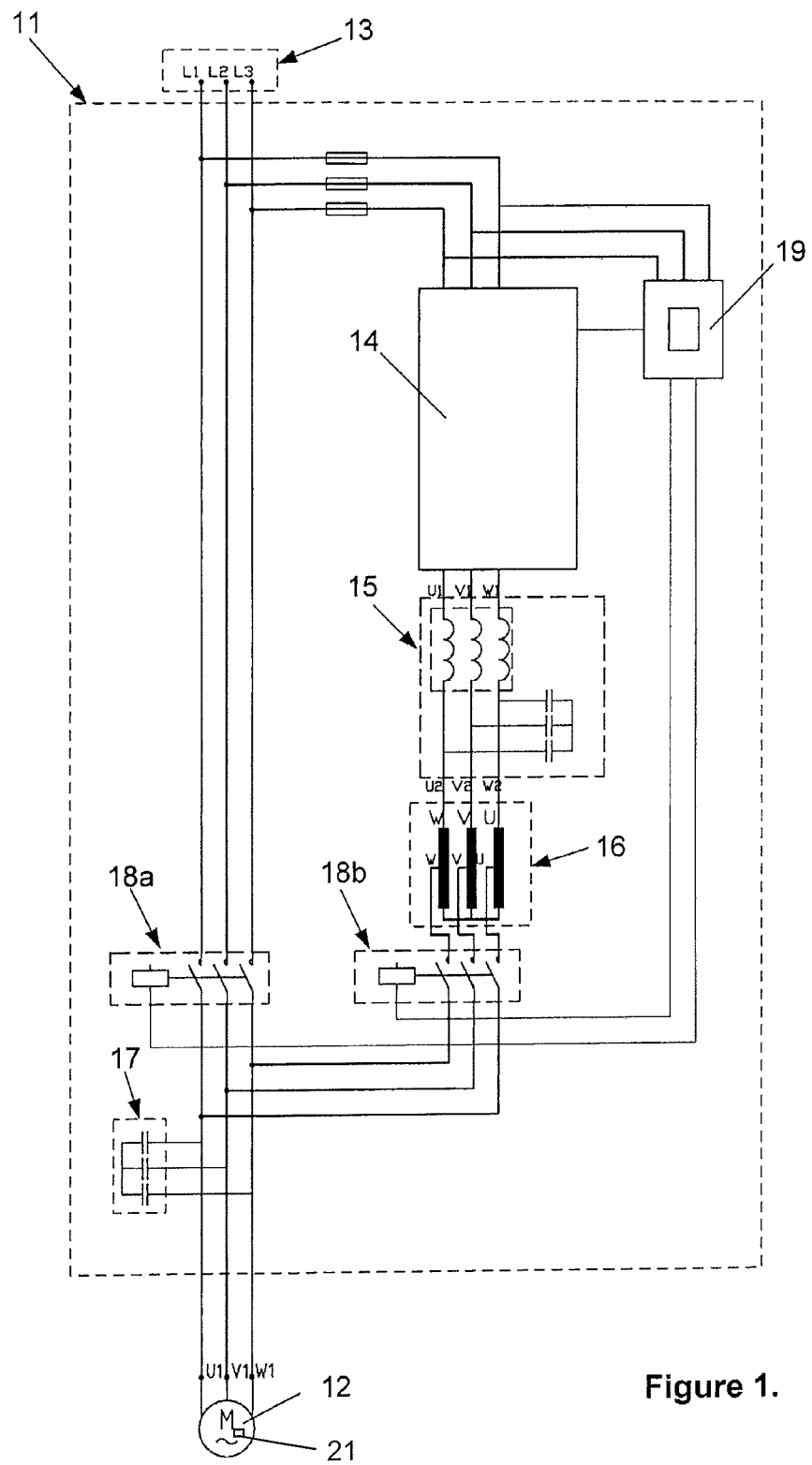
FIG. 1 is a principle drawing of a device according to the invention.

Reference is now made to FIG. 1 which shows a device 11 for starting an electrical motor 12 in weak grids. The motor is connected to a supply grid 13 for continuous powering of the motor 12 after it has started. This motor 12 can, for example, preferably be an asynchronous motor having relatively low load at start-up, e.g. approximately 10-20% kW of motor size.

The device 11 includes a frequency converter 14, which is rated in relation to the size of the motor 12 and arranged to bring the motor 12 up in speed, and arranged to synchronize the output voltage with the voltage of the supply grid 13. The frequency converter 14 preferably has a size which is 0-70% of the motor size, more preferable 0-50% of the motor size, and even more preferable 0-30% of the motor size.

To be able to reduce the size of the frequency converter 14, the device 11 includes a sinus filter 15 arranged to the output of the frequency converter 14, an autotransformer 16 arranged to the output of the sinus filter 15, and a capacitor battery 17 arranged in parallel with the motor 12.

The sinus filter 15 provides a sinusoidal voltage out from the frequency converter 14. It is preferable to have a sinusoidal voltage out to the motor as the capacitor battery 17 may not handle a pulse-width-modulated voltage with high "switching frequency". The autotransformer 16 is arranged to transform the voltage down to the motor 12 and transform the current up. The capacitor battery is arranged to remove magnetizing current of the motor 12. The autotransformer 16 will typically have 70% drawing off, which means that the output voltage is 70% of the input voltage and that the current from the frequency converter 14 is approximately 70% of the current supplied to the motor 12. The mentioned drawing off can vary between 60-80%. An asynchronous motor 12 typically has between 30-40% of nominal current as reactive current for magnetizing of the motor 12 and this does not contribute with active power. The capacitor battery 17 will contribute with capacitive power which counteracts the reactive magnetizing current of the motor 12 and will thus remove reactive power so that necessary current which the frequency converter 14 must deliver only is for active power. The capacitor battery 17 is also arranged to maintain the residual voltage in the motor 12 during switching from frequency converter power to direct powering from the supply grid. As the motor 12 maintains the residual voltage during the switching, the current peak during the switching will be considerably reduced.

The device 11 further includes switches 18a, 18b for connection and disconnection of the motor 12 to the frequency converter 14 and supply grid 13. The switches 18a, 18b work, for example, in the way that when the switch 18b is connected and the switch 18a is disconnected, the frequency converter 14 is connected, and the voltage is supplied from the supply grid 13 through the frequency converter 14 to the motor 12. When the switch 18a is connected and the switch 18b is disconnected, the voltage is supplied directly from the supply grid 13 to the motor 12. The switches 18a, 18b are preferably controlled by a control unit 19, and they are mutually electrically interlocked.

At start-up, the device will work in the way that the motor 12 will be disconnected from the supply grid 13 and connected to the frequency converter 14. The frequency converter 14 will bring up the rotational speed of the motor 12 by running output frequency from 0 Hz and up to it is identical with the frequency of the supply grid. When the voltage of the motor and the voltage of the supply grid 13 are in phase, the frequency converter 14 will be disconnected by means of the switches 18a, 18b and the motor 12 will be connected to the supply grid 13 and ready for load. In some cases it is preferable for the voltage of the motor to be some degrees in front of the voltage of the supply grid 13 to compensate for drop in motor speed as a consequence of switching time from frequency converter 14 to supply grid 13.

In this way it will be possible to start a motor 12 with less than 1×In starting current, which is a great improvement compared to prior art.

Since the device 11 includes a sinus filter 15 and an autotransformer 16 connected to the frequency converter 14, a frequency converter 14 having lower capacity can be employed, thereby resulting in substantial cost savings, and reduction in size.

The device 11 further includes a control unit 19 for controlling the device 11, which control unit 19 is provided with means and/or software for controlling the device 11. The device 11 is further provided with means for reading voltage and phase angle of the supply grid and motor 12 for input to the control unit 19. The control unit 19 is further arranged for controlling the switches 18a, 18b, and arranged for communication with external control equipment about status and when the motor 12 is started up and ready for being loaded.

Figure 2:
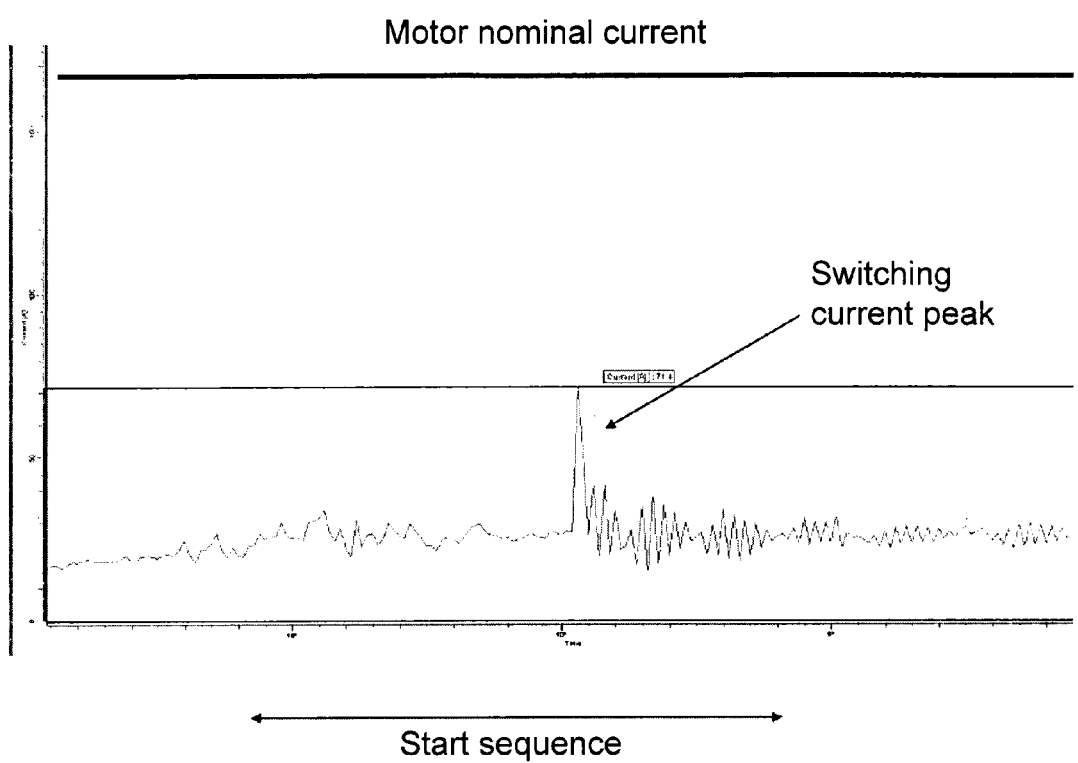
FIG. 2 shows simulation of starting a motor by means of the device in FIG. 1.

Reference is now made to FIG. 2 which shows a simulation of starting a motor 12 by means of the above described device and method. The simulated employed a motor 12 with a base load of approximately 15% (15 kW) on a motor shaft. The simulation shows that the disclosed device 11 is able to get the motor 12 on the grid with a maximal starting current of 75 A (peak), with a nominal current on the motor of 155 A. Prior art, for example a Y/D-starter, requires a starting current of 460 A to perform the same, almost three times that of the disclosed device. Maximal current in the frequency converter is approximately 40 A.

Sinus filter 15, autotransformer 16 and internal cables can be dimensioned for short-time operation, and therefore reduced considerably in size, something which will result in considerably less need for space for the device. In the shown simulation 4 mm$^2$ cables are used between the frequency converter 14, sinus filter 15 and autotransformer 16. These cables have a current-carrying capacity of 25 A against the motor's 155 A. As the frequency converter 14, sinus filter 15, cables, autotransformer 16 etc. are considerably smaller than they have to be for continuous powering, the result is a significant reduction in cost and size of the device 11.

The device is especially suitable for low-voltage motors from 200 to 4000 kW, where one need low starting current and have a low base load during start-up. A typical example is starting of a thruster motor in a vessel plant having a revolving propeller.

Other devices for which the disclosed device is suitable include compressors, pumps, etc., and other motor loads which do not require a high starting moment.

The device is also suitable for use in vessel grids, offshore installations or shore-based grids, where there is a demand for maximally allowed voltage variations.

Modifications

The disclosed device can be used to start several motors in the same electrical grid, by means of several switches.

The device can be provided with an automatic capacitor battery which automatically adjusts capacitive current in relation to reactive current consumption of the motor.

The device can be provided with means for controlling the load of the motor to ensure that the motor is not loaded during start-up, and to able to control when the motor is connected to a grid supply and can be loaded.

The motor can be provided with an encoder 21 to provide rotator position to the frequency converter, which will improve the starting properties of the frequency converter.

The invention claimed is:

1. A method for starting one or more electrical motors (12) in weak grids, which motor after start-up is powered by a supply grid (13) through a first switch (18 *a*), comprising the steps of:
   a) verifying that the motor (12) is not connected to the supply grid (13);
   b) connecting the motor (12) to a frequency converter (14) through a second switch (18 *b*), wherein the frequency converter (14) is connected to the supply grid (13);
   c) using the frequency converter (14) to raise the rotational speed of the motor (12) by running output frequency from 0 Hz to the frequency of the supply grid;
   d) removing magnetizing current of the motor (12) with a capacitor battery (17) arranged in parallel with the motor (12), so that the frequency converter (14) supplies the motor (12) with active current only;
   e) reading voltage and phase angle of the supply grid (13), and thereafter synchronizing the voltage of the motor (12) to a phase angle in front of the phase angle of the voltage of the supply grid (13) to compensate for a potential drop in motor speed as a consequence of switching time from frequency converter (14) to supply grid (13);
   f) when the voltage of the motor (12) is synchronized to a phase angle in front of the phase angle of the voltage of the supply grid (12), switching the powering of the motor (12) from frequency converter (14) to supply grid (13) by disconnecting the second switch (18 *b*) and connecting the first switch (18 *a*), such that the frequency converter (14) and supply grid (13) are not connected to the motor (12) concurrently.

2. The method of claim 1, wherein steps (a) and (b) are initiated by switching devices (18*a*, 18*b*).

3. The method of claim 1, wherein step (c) includes a step of reading the frequency of the supply grid (13) to determine when the output frequency is approximately identical therewith.

4. The method of claim 1, wherein step (e) includes a step of reading the voltage and phase angle of the motor (12), so that powering of the motor (12) can be switched from power from the frequency converter (14) to supply grid (13), as the voltage of the motor (12) is synchronized with or in front of the phase angle of the voltage of the supply grid (13).

5. The method of claim 1, wherein step (f) includes a step of confirming that the frequency converter (14) is disconnected from the motor (12) prior to the motor (12) being connected to the supply grid (13).

6. The method of claim 1, wherein step (f) includes reducing the current pulse in connection with switching between the frequency converter (14) and supply grid (13) with a capacitor battery arranged in parallel with the motor, to maintain residual voltage in the motor as the motor is switched from the frequency converter to the supply grid (13).

7. The method of claim 1, comprising repeating steps (a)-(f) for another motor (12).

8. A device (11) for starting one or more electrical motors (12) in weak grids, which motor (12) is disengageably connected to a supply grid (13) for continuous powering of the motor (12) after start-up, comprising a frequency converter (14), which is connected to the supply grid (13) and is rated in relation to the size of the motor (12) and arranged to bring the motor (12) up in speed, for synchronizing output voltage to a phase angle in front of the phase angle of the voltage from the supply grid (13), and for connecting the motor (12) to the supply grid (13) through a first switch (18 *a*) after the voltage of the motor is synchronized with a phase angle in front of the voltage of the supply grid (13) while disconnecting the motor (12) from the frequency converter (14) via disconnecting a second switch (18 *b*) therebetween, such that the frequency converter (14) and supply grid (13) are not connected to the motor (12) concurrently, wherein the device (11) includes an autotransformer (16) arranged for transforming down the voltage to the motor (12) and transforming the current up.

9. The device of claim 8, wherein the frequency converter (14) has a size adapted to necessary starting moment for the application of the motor.

10. The device of claim 8, comprising a sinus filter (15) arranged to the output of the frequency converter (14) to provide sinusoidal voltage out from the frequency converter (14).

11. The device according to claim 10, wherein the autotransformer (16) is arranged to the output of the sinus filter (15).

12. The device of claim 8, comprising switches (18*a*, 18*b*) for connection and disconnection of the motor (12) to the frequency converter (14) and supply grid (13), which switches are mutually electrically interlocked.

13. The device of claim 8, comprising a capacitor battery (17) arranged in parallel with the motor (12) for removing magnetizing current of the motor (12), and reducing current pulse in connection with switching from powering of motor (12) from the frequency converter (14) to the supply grid (13).

14. The device of claim 13, wherein the capacitor battery (17) is provided with automatic adjustment of capacitive current in relation to reactive current consumption of the motor (12).

15. The device of claim 8, comprising a voltage and phase reader for the motor (12) and for the supply grid (13).

16. The device of claim 8, provided with a motor load controller to ensure that the motor (12) is not loaded during start-up, and for controlling when the motor (12) is connected to the supply grid (13) and can be loaded.

17. The device of claim 8, wherein the motor (12) is provided with an encoder 21 to provide rotor position to the frequency converter (14) for improving the starting properties of the frequency converter (14).

18. The device of claim 8, comprising a control unit (19) having software or other means for doing one or more of: controlling the switches (18*a*, 18*b*), controlling the frequency converter (14), reading voltage and phase angle of the supply grid (13) and motor (12), and arranged for communication with external control equipment about status and when the motor (12) is started and ready for being loaded.

* * * * *